No. 614,452. Patented Nov. 22, 1898.
J. W. FEATHERS & F. HARRIS.
TREE PROTECTOR.
(Application filed Mar. 26, 1897.)
(No Model.)
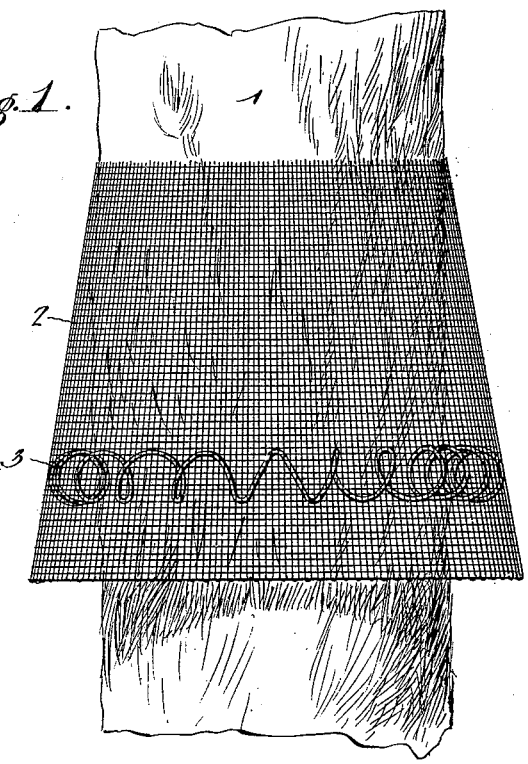
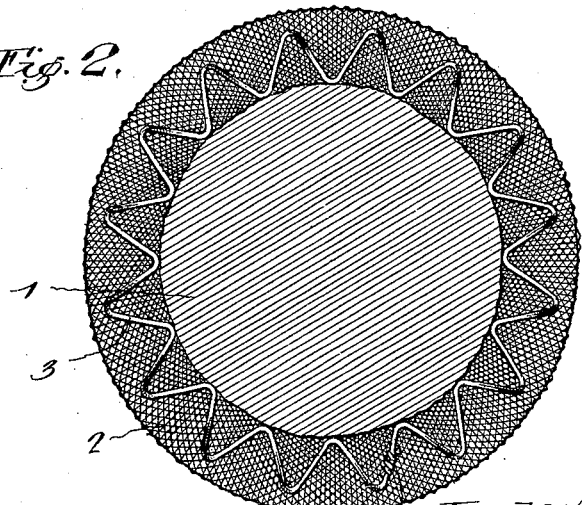
Joseph W. Feathers and
Frederick Harris, Inventors.
Witnesses
By their Attorneys.

UNITED STATES PATENT OFFICE.

JOSEPH W. FEATHERS, OF KENDALL, AND FREDERICK HARRIS, OF ALBION, NEW YORK.

TREE-PROTECTOR.

SPECIFICATION forming part of Letters Patent No. 614,452, dated November 22, 1898.

Application filed March 26, 1897. Serial No. 629,453. (No model.)

*To all whom it may concern:*

Be it known that we, JOSEPH W. FEATHERS, residing at Kendall, and FREDERICK HARRIS, residing at Albion, county of Orleans, State of New York, citizens of the United States, have invented an Improvement in Tree-Protectors, of which the following is a specification.

It is a well-known fact that worms and insects will crawl up the trunk of a tree to the branches and leaves thereof and cause considerable damage thereto.

The present invention therefore relates to tree-protectors adapted to prevent the insects from ascending the tree; and the object thereof is to provide a shield or guard, with means for spacing the same away from the tree, but not interfering to prevent the insects from getting into the trap.

Further objects and advantages of the invention will be hereinafter more fully described, shown in the drawings, and particularly pointed out in the claims.

In the drawings, Figure 1 is a side elevation of the device applied to a tree. Fig. 2 is a bottom plan view of the device.

Corresponding parts in both figures are denoted by like characters of reference.

Referring to the drawings, 1 designates the trunk of a tree having the protector applied thereto. This protector consists of a single piece of reticulated material 2, forming the body of the protector, wrapped or formed about the trunk 1 and connected thereto at its top in any suitable manner. The meeting edges of the body are connected together in any suitable or preferred manner, with the top of the body fitting snugly the tree-trunk and its lower edge flared away therefrom. To support the lower edge of the body away from the tree, a coiled-spring band 3 is arranged around the tree within the body of the protector and at a suitable distance from its lower edge. In placing the protector upon the tree the body is first secured in place and then the coiled spring is stretched around the trunk beneath the body of the protector and its free ends hooked together, as at 4, Fig. 2, the spring fitting snugly the exterior of the tree-trunk. After being thus fitted to the trunk the spring may be moved upward and adjusted within the body of the protector. By reason of this spacing-band being in the form of a coiled spring it holds itself to the tree without the aid of supplementary means and can be adjusted longitudinally of the protector to vary the flare thereof in a convenient and effective manner.

A further advantage of the coiled-spring spacing-band is that the insects may pass between the coils and not be interrupted in their progress into the body of the protector.

The insects will pass up the trunk of the tree until stopped by the upper closed end of the protector, but will not pass around and over the outside of the protector, as is a well-known fact.

We are aware that similar tree-protectors constructed of wire-gauze have been used, but believe it to be a new feature in the art to provide a coiled-spring band to space the protector from the tree, being adjustable longitudinally of the protector and the spacing-band forming its own means of attachment to the tree without interfering with the passage of the insects into the body of the protector.

Having thus described the invention, what is claimed, and desired to be secured by Letters Patent, is—

1. The combination, in a tree-protector, of a body secured at its upper end to a tree-trunk and having its lower end flared outwardly, with a coiled spring encircling the tree-trunk and arranged between the latter and the body of the protector, substantially as and for the purpose set forth.

2. The combination, in a tree-protector, of a body in the shape of a truncated cone, with a coiled spring encircling the tree-trunk and disposed between the latter and the body of the protector and held upon the tree by its own tension, substantially as shown and described.

3. The combination, in a tree-protector, of a body in the form of a truncated cone, with a coiled spring, the latter forming a spacing-band interposed between the body and the tree-trunk and capable of longitudinal adjustment thereon, substantially as shown and described.

4. The combination, in a tree-protector, of a body secured at its upper end to a tree-trunk and having its lower end flared outwardly, with a coiled spring encircling the tree-trunk and arranged between the latter and the body of the protector, the free ends of the spring being hooked together, substantially as shown and described.

JOSEPH W. FEATHERS.
FREDERICK HARRIS.

Witnesses:
E. W. WILCOX,
E. W. BRONSON.